US011765302B2

(12) United States Patent
Sone

(10) Patent No.: US 11,765,302 B2
(45) Date of Patent: Sep. 19, 2023

(54) IMAGE FORMING APPARATUS EQUIPPED WITH AN ANTI-MALWARE FUNCTION OF A PERMISSION-LIST TYPE, IMAGE FORMING METHOD USING THE SAME, AND NON-TRANSITORY COMPUTER-READABLE RECORDING MEDIUM ON WHICH IMAGE FORMING PROGRAM FOR THE SAME IS RECORDED

(71) Applicant: KYOCERA Document Solutions Inc., Osaka (JP)

(72) Inventor: Masaki Sone, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/703,154

(22) Filed: Mar. 24, 2022

(65) Prior Publication Data
US 2022/0311906 A1 Sep. 29, 2022

(30) Foreign Application Priority Data
Mar. 25, 2021 (JP) ................................ 2021-052127

(51) Int. Cl.
*H04N 1/44* (2006.01)
*G06F 21/62* (2013.01)
*H04L 9/32* (2006.01)

(52) U.S. Cl.
CPC ......... *H04N 1/4433* (2013.01); *G06F 21/629* (2013.01); *H04L 9/3247* (2013.01); *H04N 2201/0094* (2013.01)

(58) Field of Classification Search
CPC ...... H04N 1/44; H04N 1/4406; H04N 1/4413; H04N 1/4433; H04N 2201/0094; G06F 3/123; G06F 21/629; G06F 21/12; G06F 21/64; H04L 9/3247; H04L 9/3226
USPC ................................. 358/1.14, 1.15
See application file for complete search history.

(56) References Cited

U.S. PATENT DOCUMENTS

| 10,209,980 | B2* | 2/2019 | Shimizu | .................... G06F 8/65 |
| 2013/0024696 | A1* | 1/2013 | Rudelic | ................. H04L 9/3247 713/176 |
| 2015/0074420 | A1* | 3/2015 | Sone | ......................... G06F 8/65 713/187 |

FOREIGN PATENT DOCUMENTS

JP  2014-096142  5/2014

* cited by examiner

*Primary Examiner* — Kent Yip
(74) *Attorney, Agent, or Firm* — LEX IP MEISTER, PLLC

(57) ABSTRACT

An image forming apparatus includes a signature verification unit, an execution propriety determination unit, an image forming unit, and a control unit. The signature verification unit decrypts encrypted data with a preset public key in accordance with acquisition of the encrypted data, and uses the decrypted data to verify a digital signature representing authenticity and integrity of a program contained in the decrypted data; the execution propriety determination unit permits execution of a program registered in a preset permission list and the program in which digital signature is verified; the image forming unit forms an image on an image forming medium; and the control unit controls the image forming unit by executing the program permitted to be executed.

3 Claims, 4 Drawing Sheets

IMAGE FORMING APPARATUS EQUIPPED WITH AN ANTI-MALWARE FUNCTION OF A PERMISSION-LIST TYPE, IMAGE FORMING METHOD USING THE SAME, AND NON-TRANSITORY COMPUTER-READABLE RECORDING MEDIUM ON WHICH IMAGE FORMING PROGRAM FOR THE SAME IS RECORDED

This application is based upon and claims the benefit of priority from the corresponding Japanese Patent Application No. 2021-52127 filed on Mar. 25, 2021, the entire contents of which are incorporated herein by reference.

BACKGROUND

The present disclosure relates to an image forming apparatus, an image forming method, and a non-transitory computer-readable recording medium on which an image forming program is recorded.

In recent years, cyber-attacks have also been carried out on multifunction peripherals and other image forming apparatuses installed in offices, and malware infection is one type of the security threats. The malware infection infects the image forming apparatus with the malware, and causes the exploitation of information in the image forming apparatus and the unauthorized intrusion into the office network. To counter such threats, more image forming apparatuses are now equipped with an anti-malware function of a permission-list type. Accordingly, a technique to reduce the management burden of permission lists has been proposed.

SUMMARY

An image forming apparatus includes a signature verification unit, an execution propriety determination unit, an image forming unit, and a control unit.

The signature verification unit decrypts encrypted data with a preset public key in accordance with acquisition of the encrypted data, and uses the decrypted data to verify a digital signature representing authenticity and integrity of a program contained in the decrypted data;

The execution propriety determination unit permits execution of a program registered in a preset permission list and the program in which digital signature is verified;

The image forming unit forms an image on an image forming medium; and

The control unit controls the image forming unit by executing the program permitted to be executed.

DETAILED DESCRIPTION

Hereinafter, a mode (hereinafter referred to as "embodiment") for implementing the present disclosure will be described with reference to the drawings.

Figure 1:
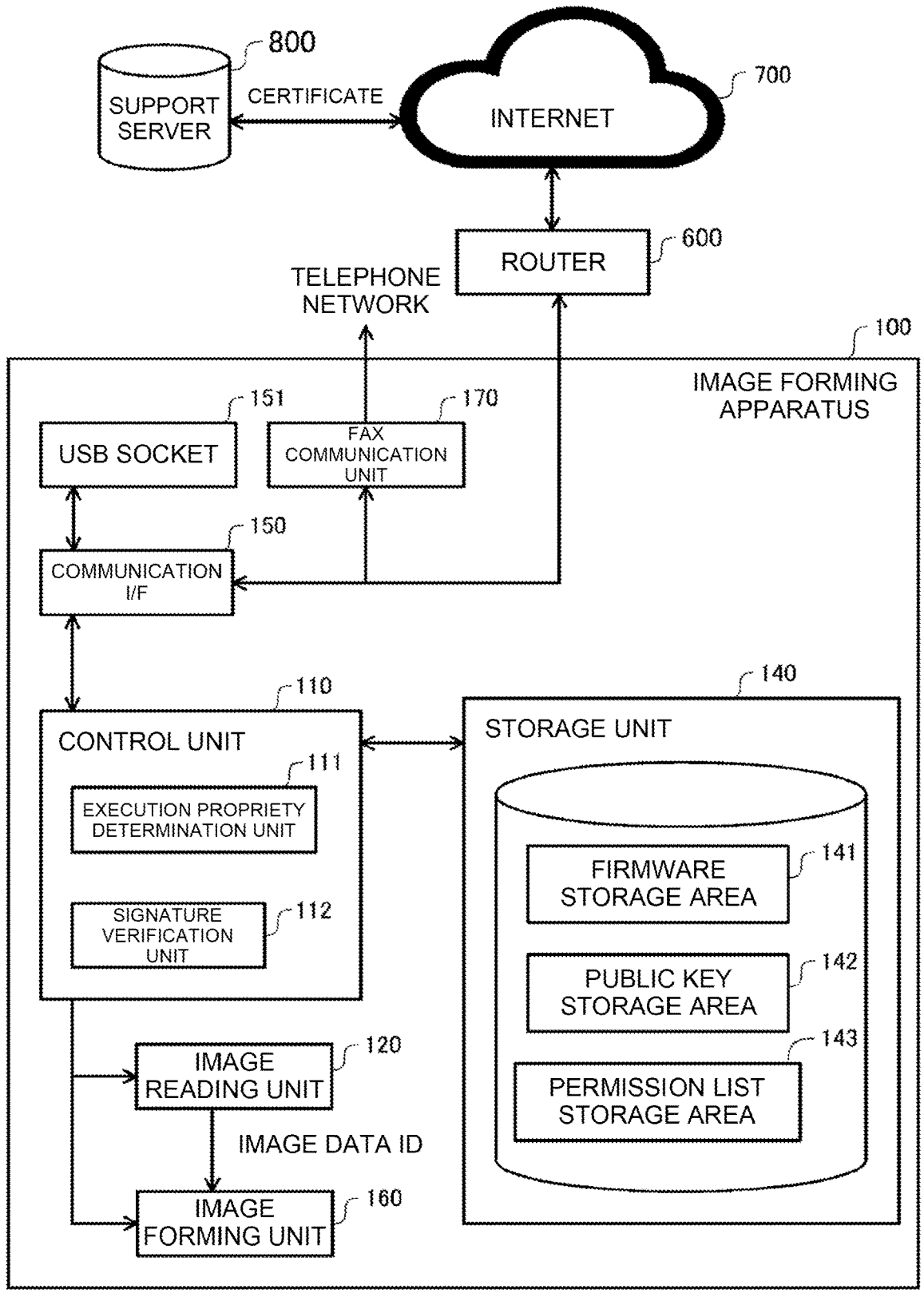
FIG. 1 is a schematic diagram showing the overall configuration of an image forming apparatus according to an embodiment of the present disclosure.

FIG. 1 is a schematic diagram showing an image forming apparatus 100 according to an embodiment of the present disclosure. The image forming apparatus 100 includes a control unit 110, an image reading unit 120, a storage unit 140, a communication interface unit 150 (also called communication I/F.), a USB socket 151, an image forming unit 160, and a fax communication unit 170. The image forming apparatus 100 can be connected to the support server 800 via the communication interface unit 150, the router 600, and the Internet.

An image reading unit 120 reads an image from an original to generate an image data ID being digital data. The image forming unit 160 forms an image on an image forming medium (not shown) based on the image data ID and a print job received from a personal computer (not shown) and discharges the image forming medium. Image forming media are also referred to as print media. A fax communication unit 170 transmits and receives a fax. In the transmission of the fax, binarization processing is executed.

The control unit 110 includes a control means such as a central processing unit (CPU). In addition, the control unit 110 has an interface-related controller function related to various I/O, a universal serial bus (USB), bus, and other hardware. The control unit 110 controls the entire image forming apparatus 100. The control unit 110 includes an execution propriety determination unit 111 and a signature verification unit 112. The functions of the execution propriety determination unit 111 and the signature verification unit 112 will be described later.

The storage unit 140 is a storage device including a hard disk drive which has a hard disk encryption function and is a non-temporary nonvolatile recording medium. The storage unit 140 has a firmware storage area 141 for storing a plurality of firmware, a public key storage area 142 for storing a public key, and a permission list storage area 143 for storing a permission list. It is assumed that the public key storage area 142 stores in advance the public key Pks corresponding to the private key Sks (see FIG. 3).

Figure 2A:
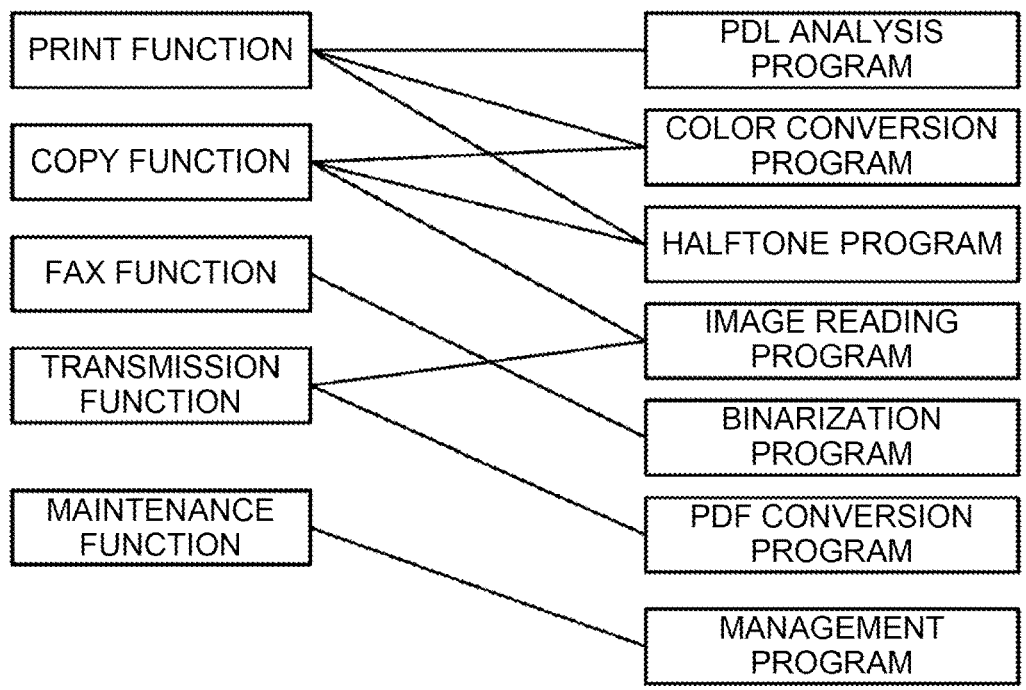
FIGS. 2A-2B are each an explanatory diagram showing a management state of firmware of an image forming apparatus according to an embodiment.
Figure 2B:
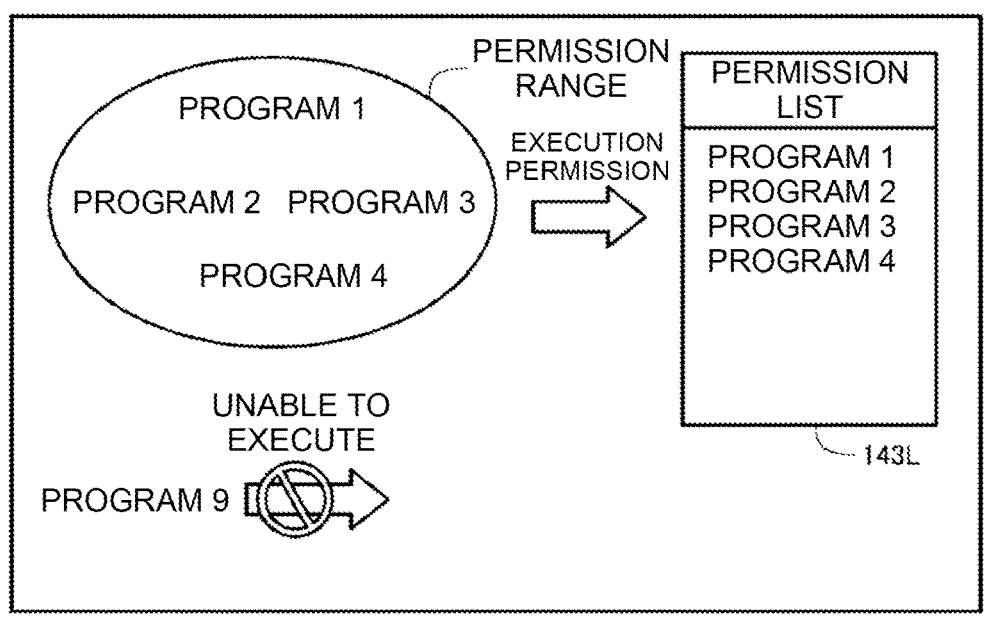

FIGS. 2A-2B are each an explanatory diagram showing a management state of firmware of an image forming apparatus according to an embodiment. FIG. 2A shows firmware used in each function of the image forming apparatus 100. Specifically, for example, the print function uses a PDL analysis program, a color conversion program, and a halftone program. The transmission function uses an image reading program and a PDF conversion program. The maintenance function uses a firmware management program (also simply called a management program.) that manages the execution of each firmware by using a permission list. The management program is stored in a non-rewritable area of the storage unit 140 when the image forming apparatus 100 is manufactured. The permission list can only be rewritten by the management program.

FIG. 2B shows the permission list 143L used in the image forming apparatus 100. The permission list 143L is a list of programs stored in the permission list storage area 143 and permitted to be executed by the image forming apparatus 100. Programs 1 to 4 are registered as permission lists in the permission list 143L, and execution of only programs 1 to 4 in the image forming apparatus 100 is permitted. The execution propriety determination unit 111 of the control unit 110 permits only the execution of a program whose safety has been confirmed in this manner to cope with an attack by a virus or malware. In this example, the program 9 is not registered in the permission list 143L.

However, there are cases in which execution of a newly developed countermeasure program or other special program is desired, for example, in maintenance (maintenance work) or debugging of the image forming apparatus 100. Security management using a permission list is not flexible in dealing with such problems. In this example, the program 9 is unpermitted to be executed as an unknown program even if it is a non-malicious countermeasure program. The inventor of the present invention proposes the following solution to such a problem.

Figure 3A:
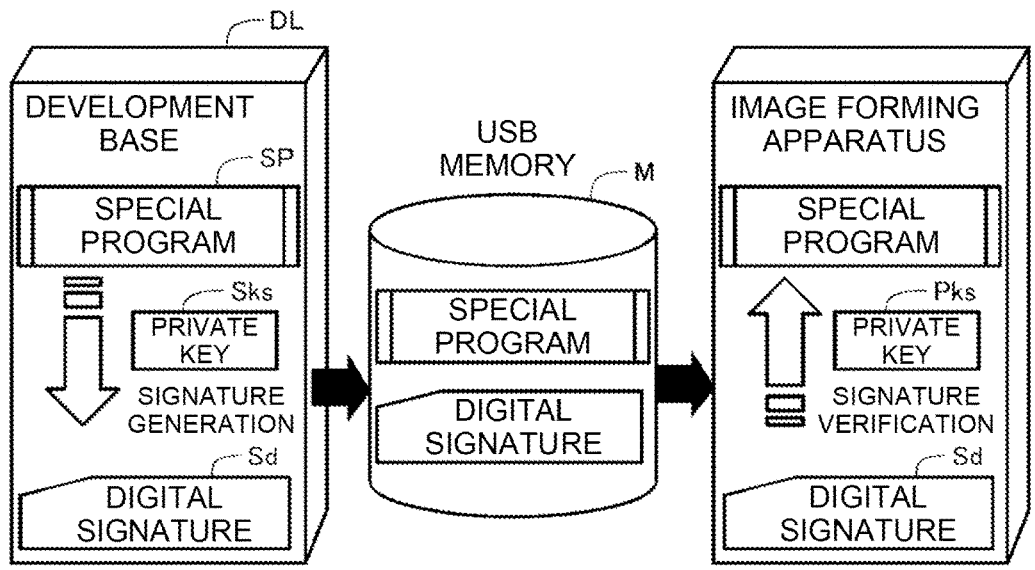
FIGS. 3A-3B area each an explanatory diagram showing an operation state of a special program for maintenance according to an embodiment.
Figure 3B:
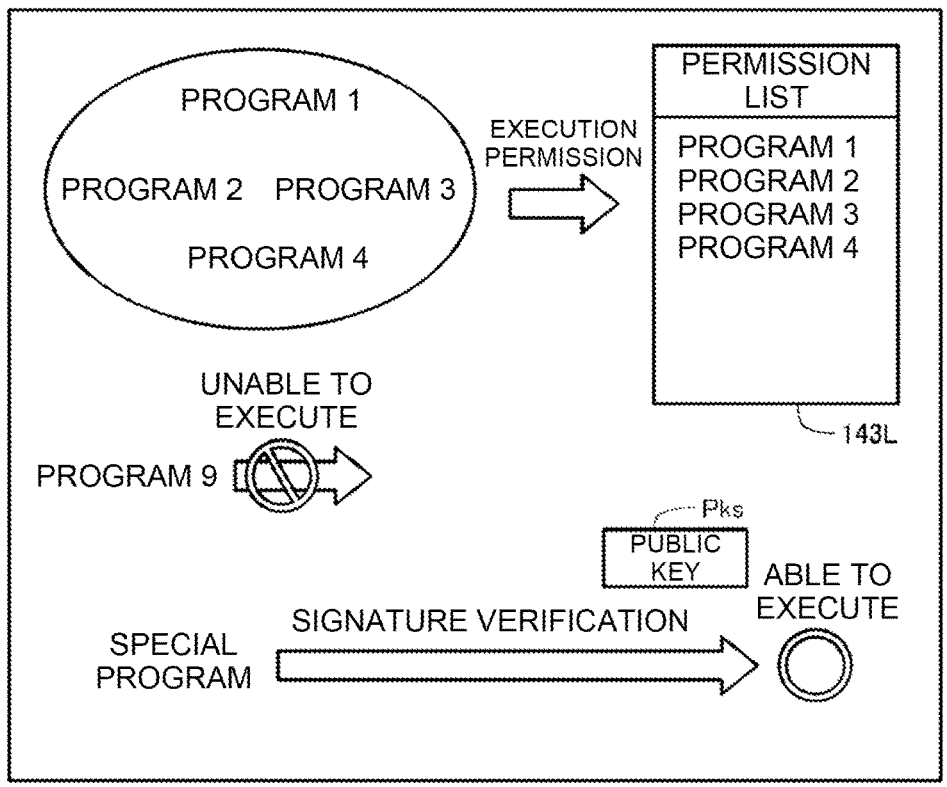

FIGS. 3A-3B are each an explanatory diagram showing an operation state of a special program for maintenance according to an embodiment. In this example, it is assumed that some kind of failure has occurred in the image forming apparatus 100 and the development base DL has developed a countermeasure program. In this example, it is assumed that the development base DL has developed a special program SP as a countermeasure program. Since the special program SP is an unknown program in the image forming apparatus 100, its execution is unpermitted.

FIG. 3A shows how the special program SP is prepared at the development base DL. A development base DL generates a digital signature Sd of a special program SP. The digital signature Sd is obtained by encrypting, with a private key Sks, a hash value of a special program SP as an object code translated into machine language. The hash value, also called a digest, can be calculated by using a hash function. The private key Sks is strictly controlled so as not to leak from the development base DL. In the development base DL, the special program SP and the digital signature Sd are stored together in the USB memory M. The USB memory M is used by a service person who specializes in maintenance work.

Figure 4:
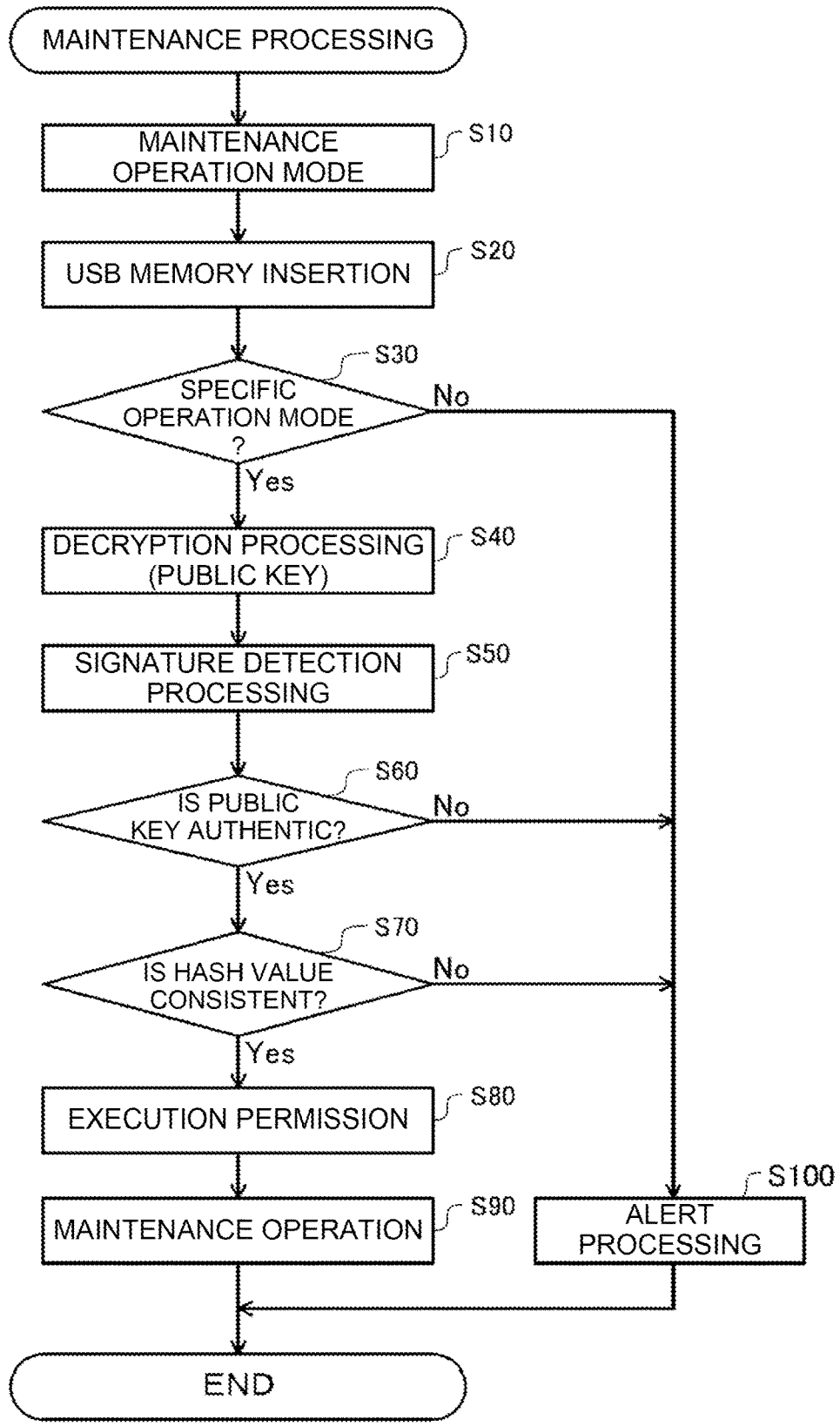
FIG. 4 is a flowchart showing the contents of maintenance processing according to an embodiment.

FIG. 4 is a flowchart showing the contents of maintenance processing according to one embodiment. The service person visits the office where the image forming apparatus 100 is set, carrying the USB memory M storing the special program SP and the digital signature Sd as encrypted data. In step S10, the service person operates the image forming apparatus 100, inputs a necessary password, and sets the operation mode of the image forming apparatus 100 to the maintenance operation mode.

In step S20, the service person inserts the USB memory M into the USB socket 151. A communication interface unit 150 detects the USB memory M and detects encrypted data. In response to detection of the encrypted data, the communication interface unit 150 notifies the control unit 110 of the fact.

In step S30, the execution propriety determination unit 111 of the control unit 110 determines whether or not the image forming apparatus 100 is in a specific operation mode (In this example, maintenance mode and debug mode). If the image forming apparatus 100 is in a specific operation mode, the control unit 110 advances the process to step S40. On the other hand, if the image forming apparatus 100 is not in the specific operation mode, the control unit 110 advances the process to step S100. In step S100, the control unit 110 executes the alert processing. In the alert processing, the control unit 110 stops reading the encrypted data from the USB memory M and displays a warning screen (not shown) indicating that the data of the USB memory M cannot be used on the operation display unit (not shown) of the image forming apparatus 100.

In step S40, the signature verification unit 112 of the control unit 110 executes decryption processing in response to the acquisition of the encrypted data. In the decryption processing, the signature verification unit 112 reads, from the USB memory M, the special program SP and the digital signature Sd encrypted with the private key Sks, and decrypts them using the public key Pks corresponding to the private key Sks. The public key Pks is read from the public key storage area 142 and used.

In step S50, the signature verification unit 112 executes signature detection processing. In the signature detection processing, the signature verification unit 112 searches for a digital signature in the decoded data. When the digital signature cannot be detected, the signature verification unit 112 displays the fact on the operation display unit (not shown) of the image forming apparatus 100. The signature verification unit 112 advances the process to step S50 in response to detection of the digital signature. In this example, the signature verification unit 112 detects the digital signature Sd in the USB memory M.

In step S60, the signature verification unit 112 determines whether or not the public key PKs is authentic. Specifically, the signature verification unit 112 requests a digital certificate from the support server 800 by using the communication interface unit 150. In this embodiment, the support server 800 functions as a public key certificate authority for proving the authenticity of the private key Sks and the public key Pks. The signature verification unit 112 confirms the authenticity of the public key PKs on the basis of the digital certificate acquired from the support server 800.

If it is determined that the public key PKs is authentic, the control unit 110 advances the process to step S60. On the other hand, if it is not determined that the public key PKs is authentic, the control unit 110 advances the process to step S100. In step S100, the control unit 110 executes the alert processing. In the alert processing, the control unit 110 stops reading data from the USB memory M and displays a warning screen requiring inspection of the image forming apparatus 100 on the operation display unit (not shown) of the image forming apparatus 100.

In step S70, the signature verification unit 112 verifies the consistency of the hash value as signature verification (see FIG. 3B). First, the signature verification unit 112 calculates a hash value of the special program SP as an object code translated into machine language by using a hash function. Second, the signature verification unit 112 acquires a hash value that is a digital signature decrypted by the public key PKs.

If both hash values match, the signature verification unit 112 can confirm the authenticity and integrity of the special program SP, that is, that the special program SP has been encrypted with the private key Sks corresponding to the public key PKs and has not been tampered with. Since the private key Sks is strictly controlled so as not to leak from the development base DL, it can be confirmed that the special program SP is provided from the development base DL and has not been tampered with.

In step S80, the execution propriety determination unit 111 of the control unit 110 permits the image forming apparatus 100 to execute the special program SP not registered in the permission list 143L as an exception process. In step S90, the service person can perform maintenance operations using the special program SP.

As described above, the image forming apparatus 100 according to one embodiment can realize smooth maintenance work by enabling flexible operation of a program while adopting a permission-list type anti-malware function. In the present embodiment, the image forming apparatus 100 determines whether or not the image forming apparatus 100 is in a specific operation mode, and permits execution of a program not registered in the permission list only when the image forming apparatus 100 is in the specific operation mode, thereby realizing a configuration in which an attack by malware is more difficult.

The permission-list type anti-malware function can also inadvertently stop non-malicious programs from working. In particular, when the use of the image forming apparatus such as maintenance work or debugging work is restricted to the image forming apparatus, it may be desired to quickly use a program necessary for the work.

According to the image forming apparatus of the present disclosure, a program can be flexibly operated while adopting a permission-list type anti-malware function.

The present disclosure may be implemented not only in the above embodiments but also in the following modifications.

Modification 1: In the above embodiment, the required password is input to set the operation mode of the image forming apparatus to the maintenance operation mode, and the signature verification unit 112 verifies the signature of encrypted data only in the maintenance operation mode. However, the operation of the present disclosure is not limited to the maintenance operation mode, and may be operated in, for example, the manager mode, that is, a specific operation mode that enables a predetermined setting change of the image forming apparatus and is activated by the input of a predetermined password.

Modification 2: The specific operation mode may have a plurality of operation modes including a first operation mode having a relatively high security level and a second operation mode having a relatively low security level. In this case, the encrypted data may include data specifying an operation mode to be permitted to be executed among the specific operation modes, and the execution propriety determination unit may permit execution of the program whose signature has been verified only in the specific operation mode.

Modification 3: In the above embodiment, the image forming apparatus acquires encrypted data by using a USB memory, but may acquire the data via another storage medium or a network, not limited to the USB memory.

Modification 4: In the above embodiment, although the support server 800 functions as a public key certificate authority, the use of a public key certificate authority is not essential, and for example, the public key may be stored in a non-rewritable area such as a ROM. Further, the public key may be stored in encrypted data together with a digital certificate issued by the support server 800. The image forming apparatus may use a public key whose authenticity is guaranteed by the digital certificate for this disclosure.

What is claimed is:

1. An image forming apparatus comprising:
a signature verification unit that decrypts encrypted data with a preset public key in accordance with acquisition of the encrypted data, and uses the decrypted data to verify a digital signature representing authenticity and integrity of a program contained in the decrypted data;
an execution propriety determination unit that permits execution of a program registered in a preset permission list and the program in which the digital signature is verified;
an image forming unit that forms an image on an image forming medium; and
a control unit that controls the image forming unit by executing the program permitted to be executed,
wherein the control unit has a specific operation mode which enables a predetermined setting change of the image forming apparatus and is operated by an input of a predetermined password, and the signature verification unit executes the decryption only in the specific operation mode, and
wherein the specific operation mode has a plurality of operation modes including a first operation mode having a relatively high security level and a second operation mode having a relatively low security level, and the encrypted data includes data for specifying an operation mode to be permitted to be executed among the specific operation modes, and
wherein the execution propriety determination unit permits execution of the program in which the digital signature is verified, only in the specific operation mode.

2. An image forming method comprising:
a signature verification step of decrypting encrypted data with a preset public key in accordance with acquisition of the encrypted data, and using the decrypted data to verify a digital signature representing authenticity and integrity of a program contained in the decrypted data;
an execution propriety determination step of permitting execution of a program registered in a preset permission list and the program in which the digital signature is verified;
an image forming step of forming an image on an image forming medium; and
a control step of controlling the image forming step by executing the program permitted to be executed,
wherein the control step has a specific operation mode which enables a predetermined setting change of the image forming step and is operated by an input of a predetermined password, and the signature verification step executes the decryption only in the specific operation mode,
wherein the specific operation mode has a plurality of operation modes including a first operation mode having a relatively high security level and a second operation mode having a relatively low security level, and the encrypted data includes data for specifying an operation mode to be permitted to be executed among the specific operation modes, and
wherein the execution propriety determination step permits execution of the program in which the digital signature is verified, only in the specific operation mode.

3. A non-transitory computer-readable recording medium on which an image forming program to control an image forming apparatus is recorded, the image forming program causing the image forming apparatus to function as:
a signature verification unit that decrypts encrypted data with a preset public key in accordance with acquisition of the encrypted data, and uses the decrypted data to verify a digital signature representing authenticity and integrity of a program contained in the decrypted data;
an execution propriety determination unit that permits execution of a program registered in a preset permission list and the program in which the digital signature is verified;
an image forming unit that forms an image on an image forming medium; and
a control unit that controls the image forming unit by executing the program permitted to be executed,
wherein the control unit has a specific operation mode which enables a predetermined setting change of the image forming apparatus and is operated by an input of a predetermined password, and the signature verification unit executes the decryption only in the specific operation mode, wherein the specific operation mode has a plurality of operation modes including a first operation mode having a relatively high security level and a second operation mode having a relatively low security level, and the encrypted data includes data for specifying an operation mode to be permitted to be executed among the specific operation modes, and wherein the execution propriety determination unit permits execution of the program in which the digital signature is verified, only in the specific operation mode.

\* \* \* \* \*